(12) United States Patent
Ishikawa et al.

(10) Patent No.: US 7,277,616 B2
(45) Date of Patent: Oct. 2, 2007

(54) OPTICAL FIBER BUNDLE AND METHOD OF MANUFACTURING THE SAME

(75) Inventors: Shinji Ishikawa, Yokohama (JP); Soichi Endo, Yokohama (JP); Toshihiko Shishido, Yokohama (JP); Ken-ichiro Miyatake, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 533 days.

(21) Appl. No.: 10/485,558

(22) PCT Filed: May 13, 2003

(86) PCT No.: PCT/JP03/05919

§ 371 (c)(1), (2), (4) Date: Feb. 3, 2004

(87) PCT Pub. No.: WO03/098291

PCT Pub. Date: Nov. 27, 2003

(65) Prior Publication Data

US 2006/0239625 A1    Oct. 26, 2006

(30) Foreign Application Priority Data

May 17, 2002    (JP)    ............................... 2002-143513

(51) Int. Cl.
*G02B 6/04*    (2006.01)
*G02B 6/00*    (2006.01)

(52) U.S. Cl. ...................... 385/115; 385/100; 385/102; 385/141; 385/142

(58) Field of Classification Search ................. 385/115
See application file for complete search history.

(56) References Cited

U.S. PATENT DOCUMENTS 4,988,162 A    1/1991    Hayami (Continued)

FOREIGN PATENT DOCUMENTS

EP    1 258 754 A2    11/2002

(Continued)

OTHER PUBLICATIONS

K. Noguchi et al., J. Lightwave Techn. vol. LT-3, No. 2, "Loss Increase for Optical Fibers Exposed to Hydrogen Atmosphere", Apr. 1985, pp. 236-243.

(Continued)

*Primary Examiner*—Frank G. Font
*Assistant Examiner*—Ryan Lepisto
(74) *Attorney, Agent, or Firm*—McDermott Will & Emery LLP (57) ABSTRACT

An optical fiber bundle that has better ultraviolet resistance characteristics at a wavelength range of 150 to 250 nm and that can be readily and cheaply manufactured with no risk of, for example, explosion during manufacturing and its manufacturing method are provided. In the optical fiber bundle, optical fibers including a core mainly containing silica glass and a cladding containing silica glass and fluorine are bundled and accommodated in a container. This container has optically transparent ends, accommodates hydrogen or deuterium as well as the optical fibers, and is sealed. The capacity of the container is 10 times or less as large as the volume of glass of the optical fibers. The method of manufacturing the optical fiber bundle includes the steps of impregnating the optical fibers with hydrogen or deuterium by keeping the optical fibers in a hydrogen or deuterium atmosphere; bundling the optical fibers and accommodating the bundled optical fibers in the container before the hydrogen or deuterium desorbs from the optical fibers; and sealing the container so that hydrogen or deuterium that has desorbed from the optical fibers can be kept in the container.

8 Claims, 8 Drawing Sheets

U.S. PATENT DOCUMENTS

| | | |
|---|---|---|
| 5,983,673 A | 11/1999 | Urano et al. |
| 2002/0172479 A1* | 11/2002 | Nakatate et al. ............ 385/115 |

FOREIGN PATENT DOCUMENTS

| | | |
|---|---|---|
| JP | 2-14850 | 1/1990 |
| JP | 5-147966 | 6/1993 |
| JP | 06-34830 | 2/1994 |
| JP | 06-56457 | 3/1994 |
| JP | 10-316445 | 12/1998 |
| JP | 11-29335 | 2/1999 |
| JP | A 2000-221355 | 8/2000 |
| JP | P2000-214336 | 8/2000 |
| JP | 2003-35829 | 2/2003 |
| JP | 2003-255155 | 9/2003 |

OTHER PUBLICATIONS

Notification of Reasons for Rejection form the Japanese Patent Office, with partial English translation.

* cited by examiner

PRIOR ART

FIG. 9

PRIOR ART

OPTICAL FIBER BUNDLE AND METHOD OF MANUFACTURING THE SAME

TECHNICAL FIELD

The present invention relates to an optical fiber bundle in which an increase in transmission loss associated with transmission of ultraviolet light with wavelengths of 150 to 250 nm can be suppressed, and also to a manufacturing method thereof

BACKGROUND ART

Ultraviolet light with wavelengths of 150 to 250 nm, which is emitted by deuterium lamps, KrF excimer lasers, ArF excimer lasers, and $F_2$ excimer lasers, has been increasingly used in the field of micromachining such as photolithography and laser machining and in medical fields, such as for sterilization and disinfection. Accordingly, optical fibers for transmitting ultraviolet light have been researched and developed as a medium for transmitting the ultraviolet light with such wavelengths. Unfortunately, transmission of ultraviolet light deteriorates the glass and increases its transmission loss. Silica glass optical fibers, although having excellent ultraviolet resistance characteristics, are unsatisfactory. The increase in the transmission loss of the silica glass optical fibers in the ultraviolet region is considered to be due to optical absorption caused by defects which the irradiation of the ultraviolet light causes in the silica glass. Consequently, methods of compensating for these defects with hydrogen atoms have been employed to improve the ultraviolet resistance characteristics.

Japanese Unexamined Patent Application Publication No. 6-034830 (Ref. 1) discloses a structure such that an optical fiber having a pure quartz core and a fluorine-doped quartz cladding is accommodated in a stainless steel (SUS) pipe, in which a high-pressure hydrogen gas atmosphere of 5 to 10 $kg/cm^2$ is kept at a high temperature of 100° C. to 150° C. by covering the outside of the SUS pipe with a heating member so that the optical fiber is exposed to the hot, high-pressure hydrogen atmosphere during or after transmission of the ultraviolet light.

Japanese Unexamined Patent Application Publication No. 6-056457 (Ref. 2) discloses a method of manufacturing an optical fiber, which is characterized in that an optical fiber drawn from a preform consisting of a pure quartz core and a fluorine-doped quartz cladding is exposed to a hydrogen atmosphere upon drawing from the preform while the optical fiber has a high temperature or to a hot hydrogen atmosphere so as to diffuse a large amount of hydrogen into the optical fiber.

Japanese Unexamined Patent Application Publication Nos. 11-029335 (Ref. 3) and 10-316445 (Ref 4) disclose a glass product and its manufacturing method, in which a quartz glass product is irradiated with electromagnetic waves to cause defects in glass and the glass product is then kept in a hydrogen atmosphere so as to substantially prevent the occurrence of an increase in optical absorption in the ultraviolet region.

Japanese Unexamined Patent Application Publication No. 2000-214336 (Ref. 5) discloses a quartz glass optical fiber in which microparticles that can store hydrogen are provided over a cladding in dispersedly distributed manner.

Japanese Unexamined Patent Application Publication No. 2000-214336 (Ref. 5) discloses a quartz glass optical fiber in which microparticles that can store hydrogen are provided over a cladding in dispersedly distributed manner. The method in Ref 1 unfortunately requires a large apparatus. The methods in Refs. 2, 3, and 4, although effective, gradually lose their effects with increasing defects caused by the ultraviolet light. These methods, therefore, are unsatisfactory for use in devices that emit strong ultraviolet light. In the method in Ref. 5, a sufficient amount of hydrogen-containing material, such as resins and hydrogen-absorbing alloys, is required to be enclosed corresponding to the volume of the optical fibers. Thus, this method is undesirable because a large container for an optical fiber bundle is required in the case where hundreds or thousands of optical fibers are bundled.

Figure 8:
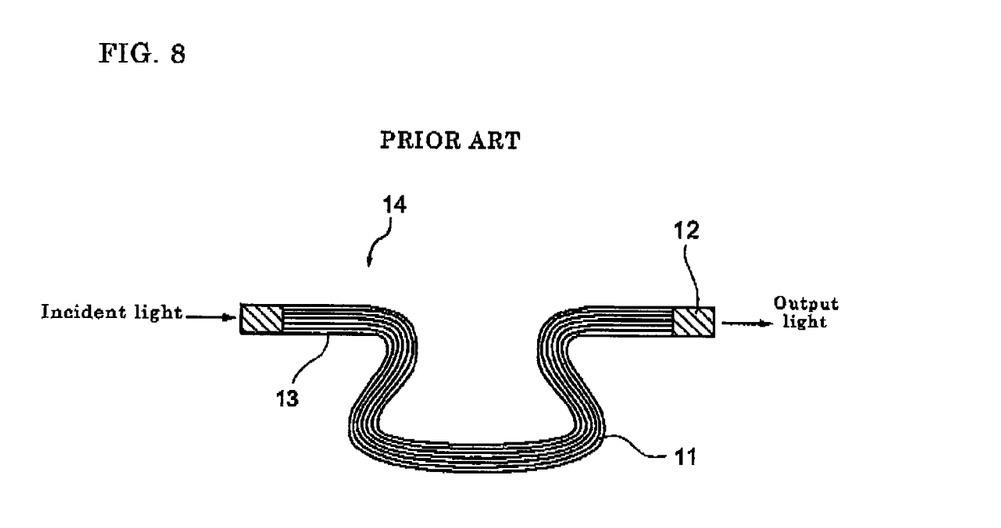
FIG. 8 is a schematic illustration of an optical fiber bundle.
Figure 9:
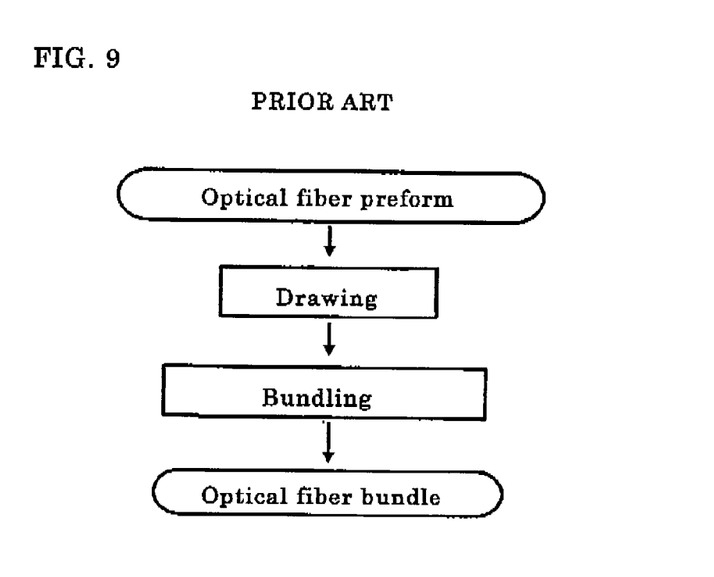
FIG. 9 is a flow chart of a known method.

FIG. 8 shows a known optical fiber bundle 14 including loosely bundled optical fibers 11, a pipe 13 accommodating the optical fibers 11, and collets 12 holding the ends of the optical fibers 11. Referring to FIG. 9, the optical fiber bundle 14 is produced by drawing optical fibers from an optical fiber glass preform, then bundling and fixing the optical fibers at their ends (bundling), and finally accommodating the bundled optical fibers in a container. A method conceivable as a combination of such techniques as described above is such that a pipe accommodating an optical fiber bundle is filled with a hydrogen-containing atmosphere and completely sealed. This method, however, has a high risk of danger such as explosion because operations involving heat treatment such as welding and sealing must be carried out while the container is filled with a hydrogen-containing atmosphere.

DISCLOSURE OF INVENTION

The object of the present invention is to provide an ultraviolet light transmitting optical fiber bundle in which optical fibers can be kept in a hydrogen-containing atmosphere so as to suppress an increase in transmission loss at wavelengths of 150 to 250 nm, and to provide a method of easily manufacturing the optical fiber bundle at low cost and with no risk of explosion during sealing a container.

To achieve this object, the present invention provides an optical fiber bundle comprising bundled optical fibers and a container for accommodating the optical fibers, each having a core mainly consisting of silica glass and a cladding consisting of silica glass doped with fluorine and having a lower refractive index than the core. The optical fibers are accommodated together with hydrogen or deuterium in the container having optically transparent windows and sealed. The capacity of the container is 10 times or less as large as the volume of glass of the optical fibers.

This method includes the steps of drawing optical fibers from a glass preform having a core mainly consisting of silica glass and a cladding consisting of silica glass doped with fluorine and having a lower refractive index than the core; impregnating the optical fibers with hydrogen or deuterium by keeping the optical fibers in a hydrogen or deuterium atmosphere; bundling the optical fibers and accommodating the bundled optical fibers in a container before the hydrogen or deuterium desorbs from the optical fibers; and sealing the container so that the hydrogen or deuterium which has desorbed from the optical fibers can be kept in the container.

The present invention will now be described in detail with reference to the drawings. These drawings, which are used for description, do not limit the scope of the present invention.

BRIEF DESCRIPTION OF THE DRAWINGS

FIGS. 1B1 and 1B2 are sectional views of an end of the optical fiber bundle 10.

BEST MODE FOR CARRYING OUT THE INVENTION

Embodiments of the present invention will now be described with reference to the drawings. In these drawings, the same reference numerals indicate the same parts to avoid redundant description. The dimensional ratios in the drawings are not necessarily precise.

In the present invention, hydrogen is added into silica glass optical fibers in advance. Before the hydrogen desorbs from these optical fibers, they are put into a container or pipe (hereinafter generically referred to as a container) and the container is sealed. Thus, it is possible to avoid the risk which may arise from sealing the container filled with a hydrogen atmosphere. The hydrogen contained in the optical fibers desorbs from the optical fibers, but the desorbed hydrogen remains in the container such that the hydrogen atmosphere in the container can prevent the formation of defects in glass.

Figure 1A:
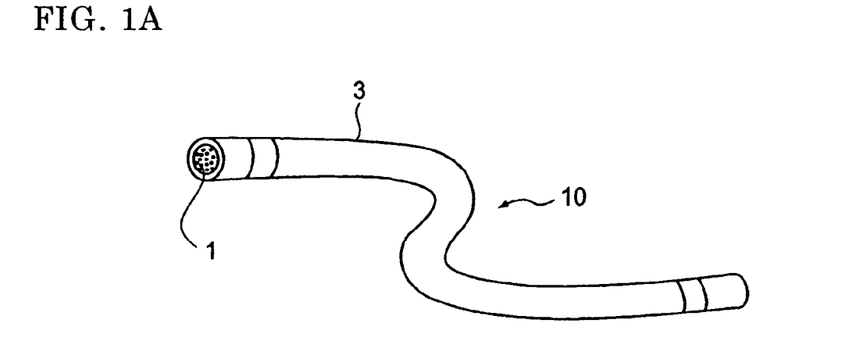
FIG. 1A is a perspective view of an optical fiber bundle 10 that exemplifies an embodiment of the present invention.

FIG. 1A is a perspective view of an optical fiber bundle 10 that exemplifies an embodiment of the present invention. This optical fiber bundle 10 includes optical fibers 1 and a container 3. Each of the optical fibers 1 includes a core having a higher refractive index and a cladding having a lower refractive index, which are exemplified in FIG. 1C. A large number of optical fibers 1 are bundled together, fixed at the ends, and accommodated in the container 3 loosely. Ultraviolet light enters at one end of the container 3, travels through the fibers, and exits through the other end of the container 3. FIGS. 1B1 and 1B2 are sectional views of an end of the optical fiber bundle 10. A collet 2 is welded to the container 3 with a weld 5 and to a window holder 6 with a weld 9. A window 7 is welded to the window holder 6 with glass solder 8. Thus, the container 3 is sealed.

Figure 2:
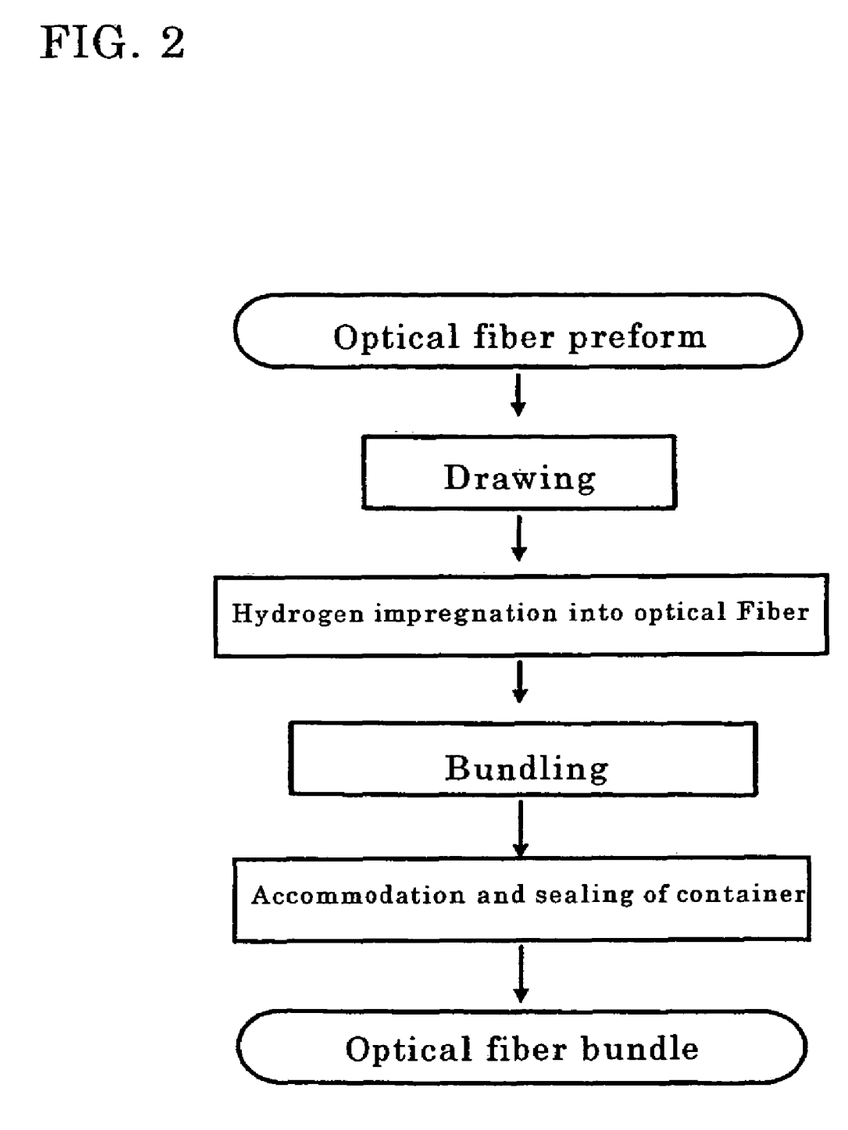
FIG. 2 is a flow chart of the manufacturing flow of the optical fiber bundle 10.

FIG. 2 is a flow chart of the manufacturing flow of the optical fiber bundle 10. First, optical fibers are drawn from optical fiber preforms prepared by a known method. These optical fibers are then kept at 60° C. to 80° C. in an atmosphere with a hydrogen partial pressure of 5 to 10 atm (0.50 to 1.01 Pa) for 20 to 100 hours to impregnate the optical fibers with hydrogen.

The saturated hydrogen content in silica glass constituting the optical fibers may be determined from Eq. (1):

$$\text{(saturated hydrogen content)} = S_0 \times P_{H_2} \exp(-E_s/RT) \quad (1)$$

wherein $P_{H_2}$ represents the hydrogen partial pressure and T represents temperature (K. Noguchi et al., J. Lightwave Techn. Vol. LT-3, No. 2, PP. 236-243 (1985)). In the Eq. (1),
$S_0 = 5.93 \times 10^{16}$ mol/(cm$^3$ atm);
$E_s = 1.38 \times 10^2$ J/mol; and
$R = 8.314$ J/(mol K).

The calculation from Eq. (1) shows that the silica glass can contain 1.2 mol % hydrogen in an atmosphere with a hydrogen partial pressure of 100 atm. Therefore, the silica glass constituting the optical fibers can contain a relatively large amount of hydrogen by being kept in a hydrogen atmosphere.

On the other hand, the hydrogen molecule diffusion coefficient in the glass is given by Eq. (2):

$$\text{(hydrogen diffusion coefficient)} = D_0 \exp(-E_d/RT) \quad (2)$$

wherein T represents temperature;
$D_0 = 14.2 \times 10^{-4}$ cm$^2$/s; and
$E_d = 10.8$ kcal/(mol K).

The optical fibers for optical fiber bundles are thin, having an outside diameter of about 125 to 180 μm. Therefore, the glass will be saturated with hydrogen, allowing the glass to contain a large amount of hydrogen, by exposing the optical fibers to a hydrogen atmosphere of 100° C. for a relatively short time, that is, for about 24 to 50 hours.

When the optical fibers are taken out from the hydrogen atmosphere, hydrogen contained in the optical fibers gradually desorbs from the glass to the outside. In the present invention, the optical fibers containing a large amount of hydrogen before such desorbing are bundled and accommodated in a container, which is subsequently sealed. The step of impregnation with hydrogen and the step of bundling may be reversed, that is, the step of impregnation with hydrogen or deuterium may be carried out after bundling. Because the container is sealed while hydrogen is still contained in the glass, desorbed hydrogen can be kept in the container.

Hydrogen partial pressure in the sealed container is defined as (the normal volume of hydrogen contained in the glass fibers)/(the capacity of the container). If the capacity of the container is 10 times or less as large as the volume of the glass portion of the optical fibers, the container can at least attain hydrogen partial pressure of a value required to compensate for defects caused by ultraviolet light irradiation, and thereby an increase in loss due to transmission of ultraviolet light can be suppressed. On the other hand, the capacity of the container must be 1.5 times or more as large as the volume of the glass portion of the optical fibers so that the container can loosely accommodate the optical fibers.

The optical fibers used for manufacturing the optical fiber bundle 10 preferably include a silica glass core having high transmittance in the ultraviolet region; the higher the transmittance of the silica glass core immediately after drawing and the smaller the decrease of transmittance due to ultraviolet light irradiation, the better. In particular, the optical fibers preferably contain fewer Si-Si defects, which are considered to be a deterioration precursor that leads to deterioration of the glass due to ultraviolet light. Preferably, the absorption loss due to the Si-Si defects of the optical fibers at a wavelength of 245 nm is less than 4 dB/m before the step of impregnation of hydrogen or deuterium.

Such optical fibers with fewer defects can be made of fluorine-doped silica glass or highly OH-group-doped silica glass. The core before the step of impregnation with hydrogen or deuterium preferably contains an OH or OD group of 100 to 1500 ppm by weight and chlorine of less than 50 ppm by weight. Alternatively, the core before the step of impregnation with hydrogen or deuterium preferably contains fluorine of 0.1 to 2.0% by weight and chlorine of less than 50 ppm by weight. In the case of fluorine-doped silica glass, absorption due to Si—OH is relatively small at wavelengths of less than 200 nm. Therefore, optical fibers including a core and cladding made of fluorine-doped silica glass are particularly preferable in the present invention.

It is preferable that the optical fibers after the step of impregnation with hydrogen or deuterium contain hydrogen or deuterium of at least $5 \times 10^{18}$ molecule/cm$^3$. This is because hydrogen or deuterium of about $5 \times 10^{18}$ molecule/cm$^3$ is necessary to compensate for defects of about $1 \times 10^{18}$ molecule/cm$^3$ caused by ultraviolet light irradiation.

To attain the effect of preventing deterioration due to ultraviolet light, preferably, the volume of glass of the optical fibers, the content of hydrogen or deuterium in the optical fibers, and the capacity of the container are determined such that the hydrogen or deuterium partial pressure in the sealed container becomes 0.03 atm or more. A hydrogen partial pressure of 5 atm is sufficient in the optical fiber container. The core preferably contains an OH or OD group of 100 to 1500 ppm by weight and chlorine of less than 50 ppm by weight. Alternatively, the core preferably contains fluorine of 0.1 to 2.0% by weight and chlorine of less than 50 ppm by weight.

Figure 3A:
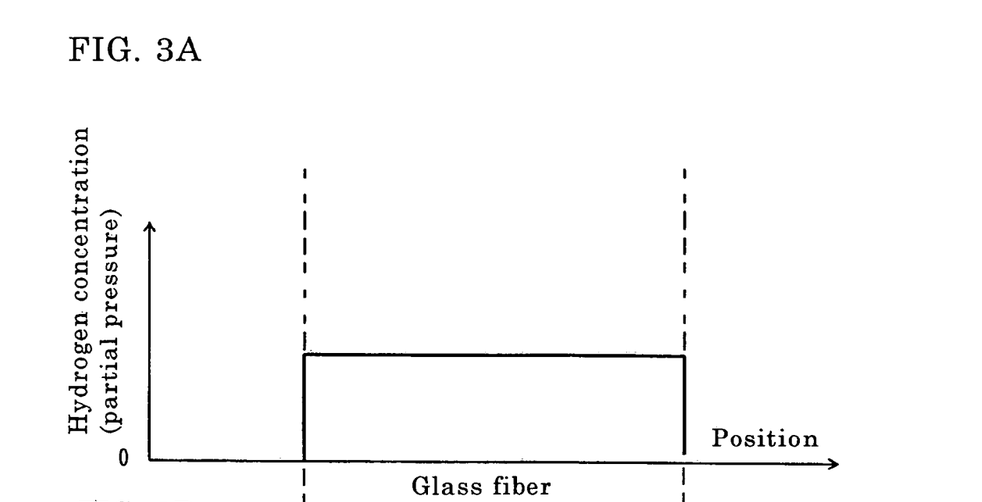
FIG. 3A is a graph showing the hydrogen concentration distribution in an optical fiber 1 immediately after impregnation with hydrogen.
Figure 3B:
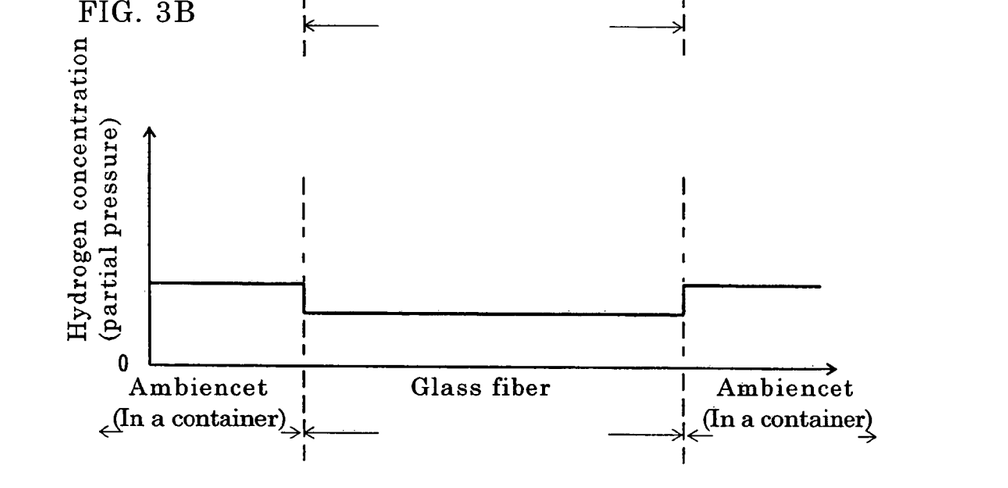
FIG. 3B is a graph showing the hydrogen concentration distribution in the optical fiber 1 and a container during use.

Table I shows examples of the saturated hydrogen content in the optical fibers in the step of impregnation with hydrogen (FIG. 3A) and the hydrogen partial pressure in the container and the saturated hydrogen content in the optical fibers after sealing (FIG. 3B), which were calculated from Eq. (1), where the hydrogen partial pressure and temperature in the step of impregnation with hydrogen are parameters. For all conditions, 480 optical fibers having a glass outside diameter of 125 μm are used (the volume of the glass portion of the optical fibers is 5.89 mm$^3$), and the container has an inside diameter of 7 mm (the capacity of the container is 32.594 mm$^3$). Silica glass having a volume of 1 cm$^3$ is $2.208 \times 10^{22}$ mol. A sufficient amount of hydrogen can be impregnated into the optical fibers to compensate for the defects of the optical fibers, if impregnation is performed in a hydrogen atmosphere of 100° C. and 3 atm.

TABLE I

| | The step of impregnation with hydrogen | | | After sealing | | |
|---|---|---|---|---|---|---|
| Condition | Hydrogen partial pressure atm | Temperature ° C. | Saturated hydrogen content mol/cm$^3$ | Hydrogen partial pressure atm | Saturated hydrogen content molecule/cm$^3$ | Determination of ultraviolet resistance characteristics |
| 1 | 1 | 100 | $1.29 \times 10^{18}$ | 0.0087 | $2.60 \times 10^{16}$ | x |
| 2 | 3 | 100 | $3.87 \times 10^{18}$ | 0.0260 | $7.79 \times 10^{16}$ | o |
| 3 | 5 | 100 | $6.46 \times 10^{18}$ | 0.0434 | $1.30 \times 10^{17}$ | o |
| 4 | 7 | 100 | $9.04 \times 10^{18}$ | 0.0608 | $1.82 \times 10^{17}$ | o |
| 5 | 50 | 25 | $1.04 \times 10^{20}$ | 0.9422 | $2.82 \times 10^{18}$ | o |
| 6 | 100 | 25 | $2.80 \times 10^{20}$ | 1.8843 | $5.64 \times 10^{18}$ | o |
| 7 | 150 | 25 | $4.20 \times 10^{20}$ | 2.8265 | $8.46 \times 10^{18}$ | o |
| 8 | 200 | 25 | $5.61 \times 10^{20}$ | 3.7687 | $1.13 \times 10^{19}$ | o |
| 9 | 250 | 25 | $7.01 \times 10^{20}$ | 4.7109 | $1.41 \times 10^{19}$ | o |
| 10 | 400 | 25 | $1.12 \times 10^{21}$ | 7.5374 | $2.26 \times 10^{19}$ | o |

(o means "good" and x means "bad")

According to the present invention, the container can keep significantly high-pressure hydrogen. In the case where 500 lengths of optical fibers having an outside diameter of 125 μm have been kept in a hydrogen atmosphere of 20° C. and 400 atm for about 20 days, and are accommodated in a container made of an SUS pipe having an inside diameter of 7 mm, which is subsequently sealed, an H$_2$ partial pressure in the pipe becomes as high as 7.5 atm. In this case, the H$_2$ concentration in the glass fibers becomes 1000 ppm. This concentration is 1000 times as high as the expected amount of defects in glass, namely, 1 ppm. For maintaining such a pressurized state, the container requires a suitable sealing structure to resist the pressure.

For a more practical example, 500 optical fibers saturated with hydrogen in a hydrogen atmosphere of 100° C. and 5 atm are accommodated in an SUS pipe having an inside diameter of 7 mm, and subsequently the pipe is sealed. Then, the hydrogen partial pressure in the pipe becomes 0.04 to 0.05 atm, and the hydrogen concentration in the glass becomes 5 to 6 ppm, allowing a margin of about 5 times as high as the amount of defects.

For another example, optical fibers are kept in a hydrogen atmosphere of 25° C. and 100 atm for 20 days to saturate the glass fibers with hydrogen at a concentration of about 1 mol %. Then, these fibers are left in air at 25° C. for 3 days to decrease the hydrogen concentration to about 15% of the initial value. Subsequently, the fibers are accommodated in the same SUS pipe as in the above example. The pipe is sealed, and the hydrogen partial pressure in the pipe becomes 0.25 to 0.30 atm, and the hydrogen concentration in the glass becomes 30 to 35 ppm, allowing a margin of 20 times or more as high as the expected amount of defects. The advantage of adding the process in which a predetermined amount of hydrogen is removed from the optical fibers once saturated with hydrogen molecules at a high concentration as described above, is that the operating efficiency can be improved if the optical fibers are bundled and subsequently housed into the sealing pipe during such a process of hydrogen removal.

In the present invention, a flexible metal container can be adopted as the container that can be sealed. The container may have any shape: for example, a tubular shape, and may be made of a material, such as SUS, copper, or aluminum.

Figure 1B:
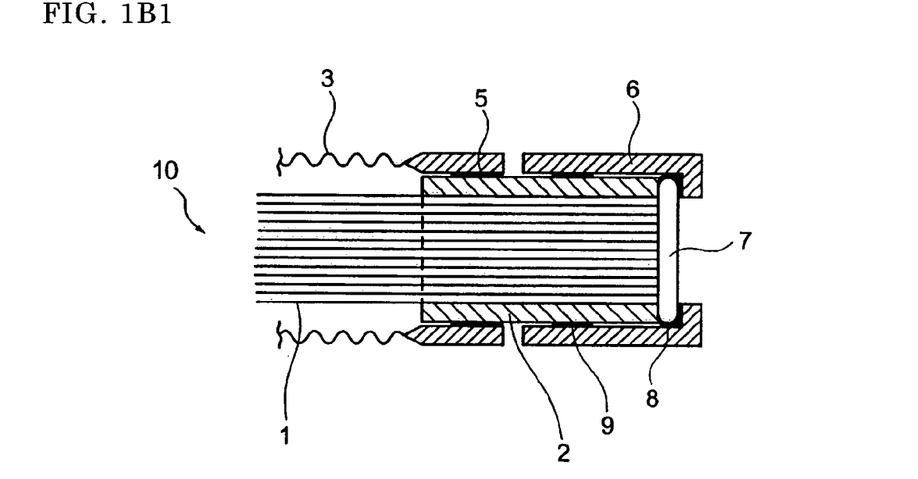
Figure 1B:
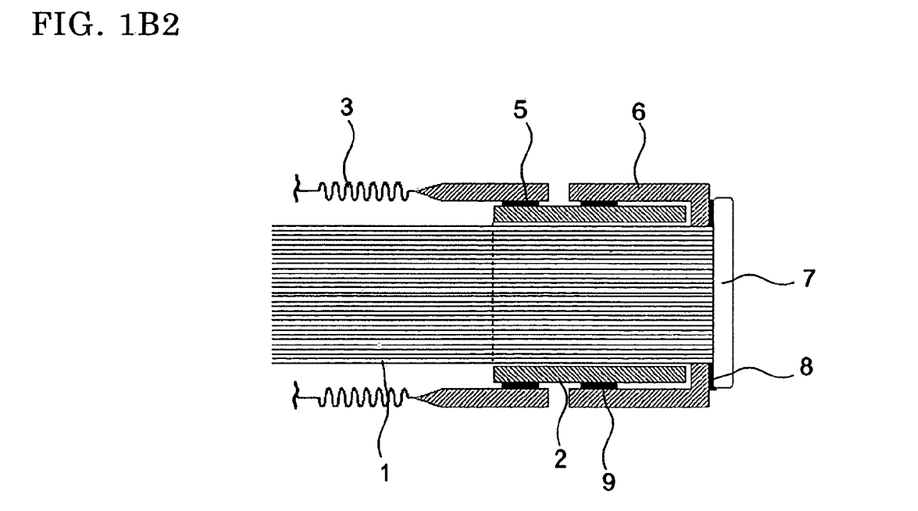
Figure 1C:
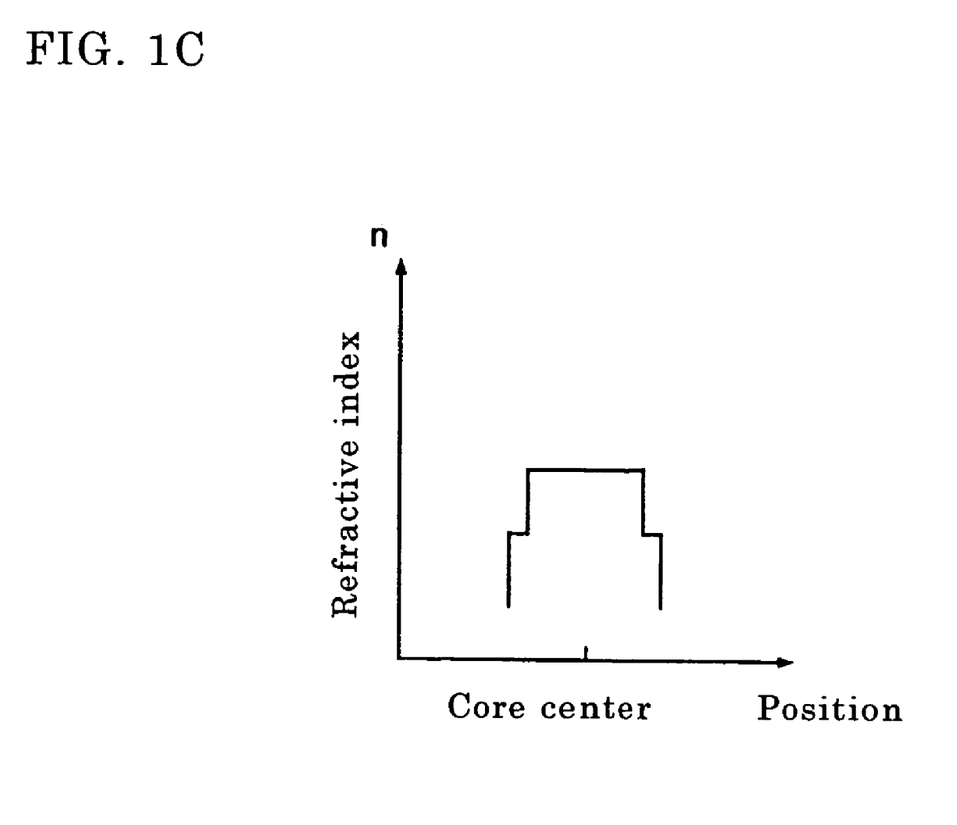
FIG. 1C is a graph showing an example of the refractive index profile of optical fibers in the optical fiber bundle 10.

The sealing of the container accommodating the optical fiber bundle is accomplished by using windows having airtightness for hydrogen gas and including a part that is transparent at the specific wavelength in use. The windows are provided on the ends of the optical fiber bundle to seal the container as shown in FIGS. 1B1 and 1B2. The windows preferably have an internal transmittance (net transmittance excluding the effect of surface reflection) of 99% or more. Preferably, the windows have a thickness of 0.5 mm or more and the material thereof is selected from silica glass, calcium fluoride, and aluminum oxide. Such windows can attain light transparency and seal the container.

Although the above description of this embodiment is mainly concerned about optical fibers impregnated with hydrogen, the same effects can be obtained also in the case of optical fibers impregnated with deuterium, simply by slightly adjusting time and temperature.

EXAMPLE 1

An optical fiber preform was drawn into optical fibers each including a core of silica glass doped with fluorine of 1% by weight (relative refractive index difference $\Delta=-0.27\%$ with reference to the refractive index of pure silica glass) and a cladding of silica glass doped with fluorine of 4% by weight ($\Delta=-1.2\%$). The core had a diameter of 112 μm, while the cladding had a diameter of 125 μm. These optical fibers were kept in a hydrogen atmosphere of 80° C. and 5 atm for 60 hours to impregnate the optical fibers with hydrogen. Then, 500 lengths of the optical fibers were bundled into an optical fiber bundle having a length of 1 m and the optical fiber bundle was put into a flexible SUS pipe. As shown in FIG. 1B1 or 1B2, silica glass windows were provided on the ends of the pipe. The container, collets, and window holders were welded together to seal the container. The optical fibers in the resultant optical fiber bundle had a hydrogen concentration of 7 molar ppm or more.

Figure 4A:
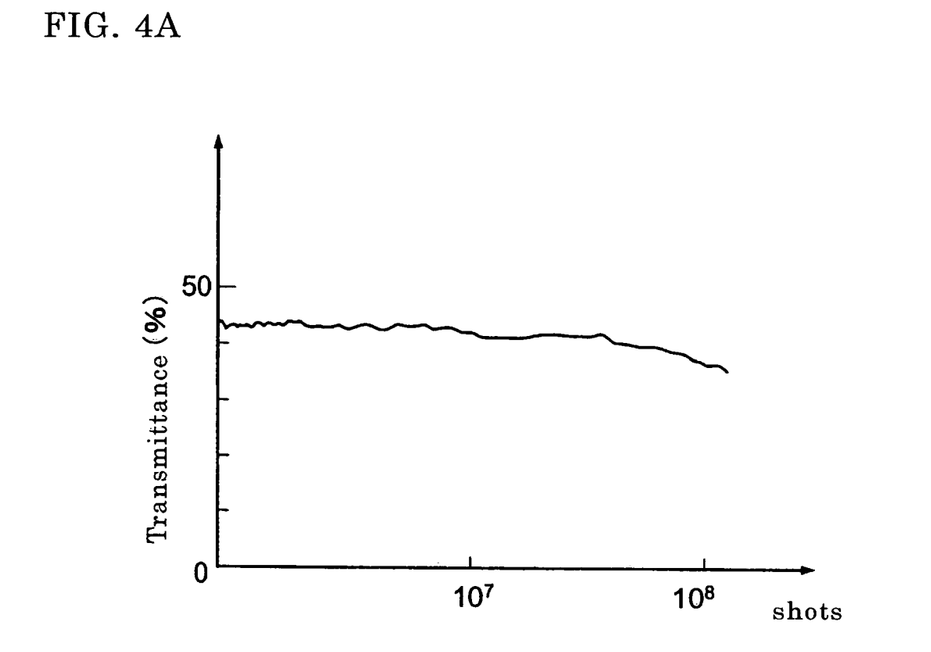
FIG. 4A is a graph showing changes in the transmittance of the optical fiber bundle 10 during ArF excimer laser irradiation.
Figure 4B:
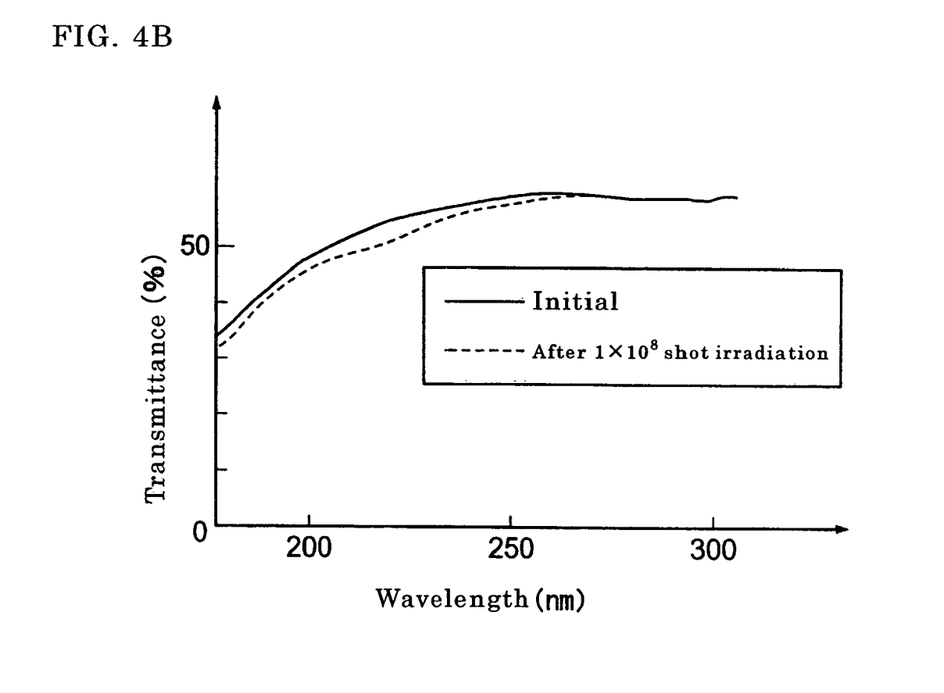
FIG. 4B is a graph showing the transmittance of the optical fiber bundle 10 before and after the ArF excimer laser irradiation.

Then, $10^8$ shots of an ArF excimer laser beam (a wavelength of 193 nm) with 5 mJ/shot-were applied to the incident end of the optical fiber bundle and the changes in the transmittance of the optical fiber bundle at a wavelength of 193 nm were measured. The initial transmittance of the optical fiber bundle at wavelengths of 180 to 300 nm and the transmittance of the optical fiber bundle subjected to $10^8$ shots of the ArF excimer laser beam are shown in FIG. 4B. The optical fiber bundle in Example 1 had a change of 5% or less in the transmittance at a wavelength of 193 nm and absorption of 3% to 4% at a wavelength of 215 nm. Therefore, the optical fiber bundle had excellent ultraviolet resistance characteristics.

COMPARATIVE EXAMPLE

Figure 5A:
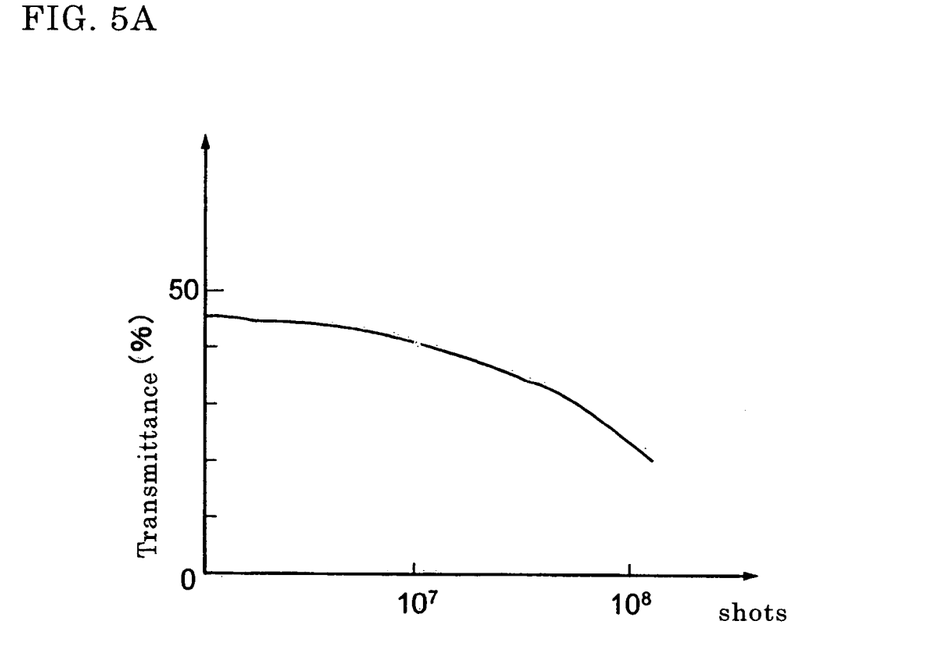
FIG. 5A is a graph showing changes in the transmittance of an optical fiber bundle in a comparative example during ArF excimer laser irradiation.
Figure 5B:
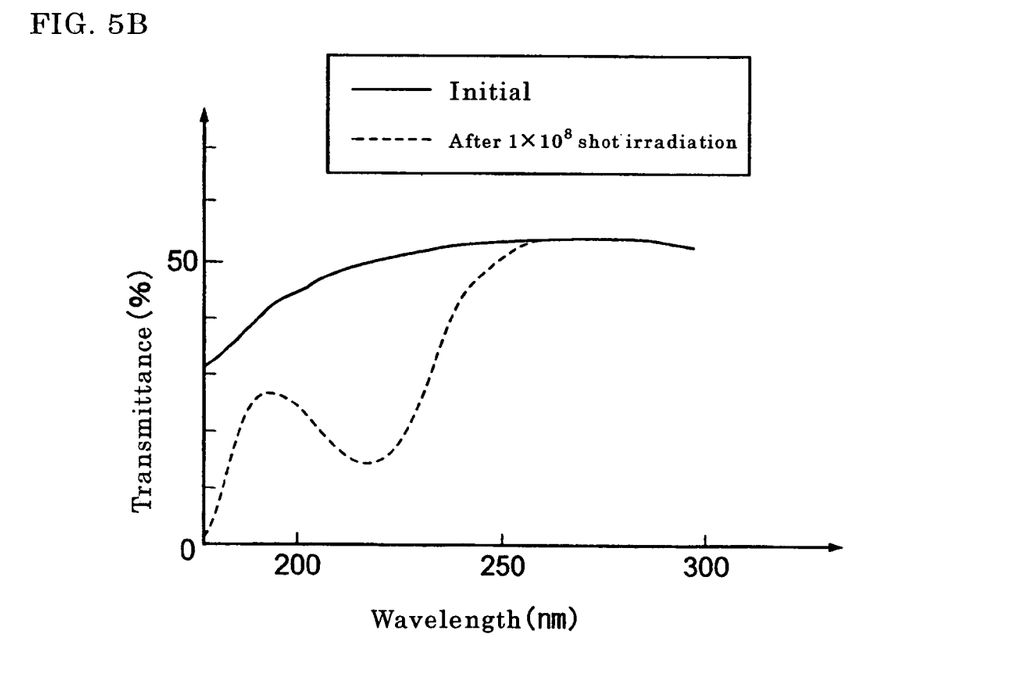
FIG. 5B is a graph showing the transmittance of the optical fiber bundle in the comparative example before and after the ArF excimer laser irradiation.

An optical fiber bundle was prepared, as shown in the flow chart of FIG. 9, using the same optical fibers as in Example 1 and in the same manner as in Example 1 except that the step of impregnation with hydrogen was omitted. This optical fiber bundle was irradiated with an ArF excimer laser under the same conditions as in Example 1. FIG. 5A shows the relation between the number of the shots and the transmittance at a wavelength of 193 nm. FIG. 5B shows measurements of the initial transmittance of the optical fiber bundle at wavelengths of 180 to 300 nm and the transmittance of the optical fiber bundle irradiated with $1\times10^8$ shots of the ArF excimer laser beam. The optical fiber bundle in the comparative example had a loss of 20% or more in the transmittance at a wavelength of 193 nm and losses in the transmittance at wavelengths of 215 um and 200 um or less. Therefore, the optical fiber bundle had poor ultraviolet resistance characteristics.

EXAMPLE 2

Figure 6:
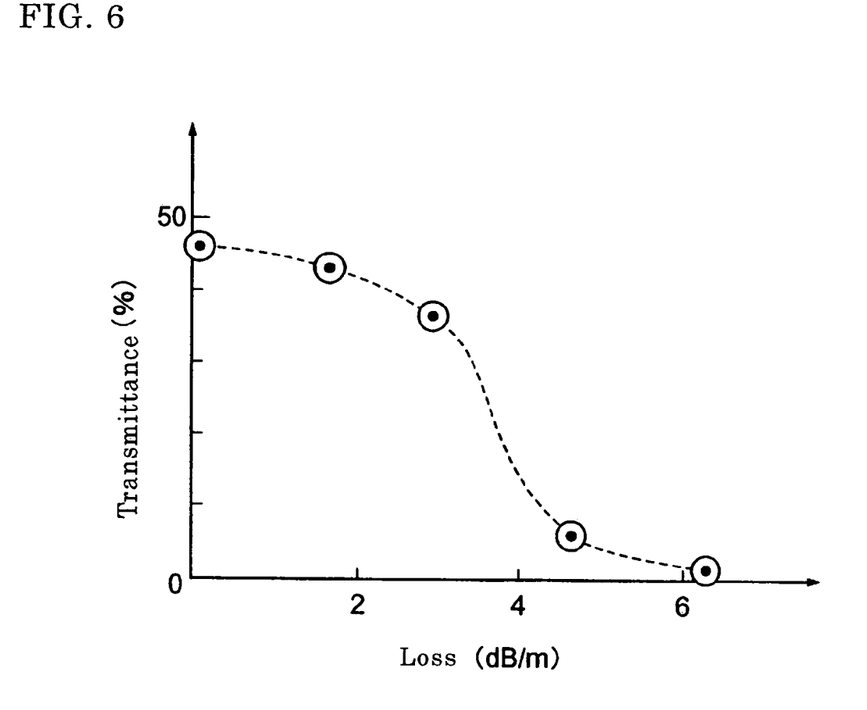
FIG. 6 is a graph showing the relation between the initial loss of an optical fiber in Example 3 and the transmittance of the optical fiber after ArF excimer laser irradiation.

Optical fiber bundles were prepared according to the same process as in Example 1, each using 500 lengths of optical fibers having initial transmission losses of 2 dB/m, 4 dB/m, and 6 dB/m, respectively. These optical fibers include a silica glass core having a diameter of 112 μm and a fluorine-doped silica glass cladding having a diameter of 125 μm. The hydrogen partial pressure in the container of each optical fiber bundle was 5% by volume. The optical fiber bundles were then irradiated with an ArF excimer laser, as in Example 1. FIG. 6 shows measurements of the transmittance of the optical fiber bundles. The optical fiber bundles prepared, according to the present invention, using the optical fibers with an initial transmission loss of less than 4 dB/m had excellent ultraviolet resistance characteristics.

EXAMPLE 3

Figure 7:
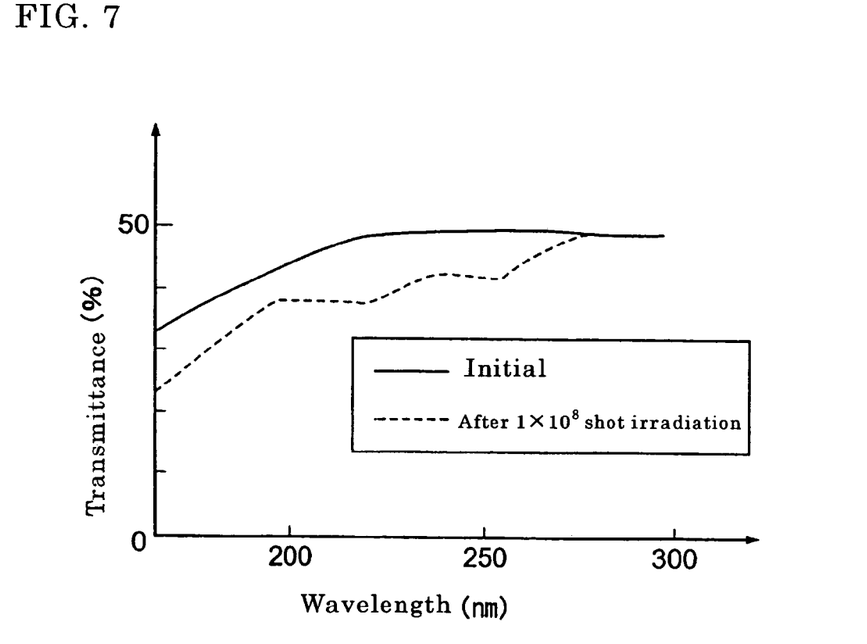
FIG. 7 is a graph showing the transmittance of an optical fiber bundle in Example 3 before and after the ArF excimer laser irradiation.

An optical fiber bundle was prepared, using optical fibers each having a core of silica glass doped with an OH group of 0.1% by weight ($\Delta=-0.01\%$) and a cladding of silica glass doped with fluorine of 4.4% by weight ($\Delta=-1.2\%$). The core had a diameter of 112 μm, while the cladding had a diameter of 125 μm. This optical fiber bundle was irradiated with an ArF excimer laser, as in Example 1. FIG. 7 shows measurements of the initial transmittance of the optical fiber bundle at wavelengths of 180 to 300 nm and the transmittance of the optical fiber bundle irradiated with $10^8$ shots of the ArF excimer laser beam. The OH-group-doped silica glass core, when irradiated with ultraviolet light, causes reactions represented by Chemical Formulas (a) and (b):

The reaction of Formula (a) results in absorption at wavelengths of 190 and 260 nm, while the reaction of Formula (b) results in absorption at a wavelength of 215 nm. The optical fiber bundle, therefore, had two peaks of the transmittance in the wavelength range of 200 nm or more. The present invention can be applied to the fluorine-doped silica glass more advantageously than the OH-group-doped silica glass in terms of the characteristics of the resultant optical fiber bundle.

INDUSTRIAL APPLICABILITY

According to the present invention, it is unnecessary to fill the container with a hydrogen atmosphere at the time when an optical fiber bundle is put into a container and the container is sealed. Thus, the container can be readily and safely sealed, the manufacturing process can be simplified, and the cost can be reduced. Furthermore, the optical fiber bundle for transmitting ultraviolet light according to the present invention, having better ultraviolet resistance characteristics, can suppress an increase in transmission loss due to deterioration by ultraviolet light irradiation. This optical fiber bundle is significantly preferred for light transmission in, for example, semiconductor manufacturing equipment, medical equipment, and analytical equipment, which use ultraviolet light of ArF excimer lasers and KrF excimer lasers (a wavelength of 247 nm).

All disclosures in the specification, claims, drawings, and abstract of Japanese Patent Application No. 2002-143513 (filed on May 17, 2002) are incorporated in the present description.

The invention claimed is:

1. An optical fiber bundle, comprising:
   bundled optical fibers each having a core mainly consisting of silica glass and a cladding consisting of silica glass doped with fluorine, the cladding having a refractive index lower than that of the core; and
   a container having optically transparent ends,
   wherein said bundled optical fibers are accommodated together with hydrogen or deuterium in the container and sealed,
   the capacity of the container is 10 times or less as large as the volume of glass of the optical fibers, and
   each core contains an OH or OD group of 100 to 1500 ppm by weight and chlorine of less than 50 ppm by weight.

2. An optical fiber bundle according to claim 1, wherein the partial pressure of the hydrogen or deuterium is 0.03 atm or more.

3. An optical fiber bundle according to claim 1, wherein the ends of the container each comprise a window having air-tightness for hydrogen or deuterium and having an internal transmittance of 99% or more at a wavelength used for the optical fiber bundle.

4. An optical fiber bundle according to claim 3, wherein the material for the windows is selected from silica glass, calcium fluoride, and aluminum oxide, and the windows have a thickness of 0.5 mm or more.

5. An optical fiber bundle, comprising:
   bundled optical fibers each having a core mainly consisting of silica glass and a cladding consisting of silica glass doped with fluorine, the cladding having a refractive index lower than that of the core; and
   a container having optically transparent ends,
   wherein said bundled optical fibers are accommodated together with hydrogen or deuterium in the container and sealed,
   the capacity of the container is 10 times or less as large as the volume of glass of the optical fibers, and
   each core contains fluorine of 0.1% to 2.0% by weight and chlorine of less than 50 ppm by weight.

6. The optical fiber bundle according to claim 5, wherein the partial pressure of the hydrogen or deuterium is 0.03 atm or more.

7. The optical fiber bundle according to claim 5, wherein the ends of the container each comprise a window having air-tightness for hydrogen or deuterium and an internal transmittance of 99% or more at a wavelength used for the optical fiber bundle.

8. The optical fiber bundle according to claim 7, wherein the material for the windows is selected from silicon glass, calcium fluoride, and aluminum oxide, and the windows have a thickness of 0.5 mm or more.

* * * * *